United States Patent Office 2,836,584
Patented May 27, 1958

2,836,584

SUSPENSION POLYMERIZATION SYSTEM FOR ALKENYL AROMATIC POLYMERS

George L. Wheelock, Akron, and John R. Smith, Massillon, Ohio, assignors to The B. F. Goodrich Company, New York, N. Y., a corporation of New York No Drawing. Application October 4, 1955
Serial No. 538,513

10 Claims. (Cl. 260—84.3)

This invention relates to an improved method for suspension polymerization of monomer mixtures containing a major proportion of an alkenyl aromatic compound and relates more particularly to a method for the suspension polymerization of monomer mixtures comprising a major proportion of a styrene and a minor proportion of a polyolefin in the presence of small amounts of a suspending agent and another surface-active agent and a redox initiator system.

Suspension polymerization systems for making polystyrene and similar resins are known. Application of these known suspension systems to the polymerization of monomer mixtures containing a major proportion of styrene and a minor proportion of butadiene-1,3 has not been successful. Such systems ordinarily involve exceedingly long polymerization times, formation of coagulum during the polymerization, and in systems which are more stable, the formation of a mixture of suspended particles and latex.

It is one of the objects of this invention to provide a suspension polymerization system for polymers of alkenyl aromatics with polyolefins which have reasonable reaction rates. It is another object of this invention to provide a process for polymerizing alkenyl aromatics such as styrene and polymerizable styrene derivatives with conjugated diolefins such as butadiene-1,3 and isoprene, which result in high yield of controlled particle size polymers. It is still another object of this invention to provide suspension polymerization systems for monomer mixtures comprising a major proportion of a styrene and a minor proportion of a conjugated diolefin such as butadiene-1,3 which do not have a tendency to form a mixture of a latex and suspended particles.

This invention now provides a suspension polymerization system for monomer mixtures containing a major proportion of an alkenyl aromatic monomer and a minor proportion of a conjugated polyolefin monomer copolymerizable therewith, which proceeds at a reasonable reaction rate so as to be commercially successful, with the formation of controlled particle size polymers without the formation of undesirable latices mixed with said particles. This is accomplished by means of a novel and critical balance of a particular suspending agent and another surface-active agent used in conjunction with a redox initiator system.

In the practice of the invention monomer mixtures containing from about 75 to about 95 weight parts of a polymerizable alkenyl aromatic monomer such as styrene and polymerizable styrene derivatives, and 5 to 25 weight parts of a polyolefin, preferably a conjugated diolefin such as butadiene-1,3 and polymerizable butadiene derivatives, are suspended in water with a small amount of a mixture of (1) an alkali metal salt of an alkyl sulfate and/or an alkylaryl sulfonate and (2) polyvinyl alcohol, in the presence of a small amount of (3) an organic peroxide or hydroperoxide and (4) a trace of a water-soluble reducing agent. All of (1), (2), (3) and (4) are essential to the successful practice of the suspension process of this invention.

The amount, the type and the ratio of the above-mentioned suspending and surface-active agents are critical in order to achieve the desired results set forth above. The surface-active agent is an emulsifying agent, an alkali metal alkyl sulfate or alkylaryl sulfonate, preferably a sodium alkyl sulfate containing 8 to 14 carbon atoms and preferably 10 to 12 carbon atoms, or sodium alkyl benzene or naphthalene sulfonate in which said alkyl group contains 8 to 14 carbon atoms, more preferably 10 to 12 carbon atoms. The amount of these agents employed is preferably about 0.003 mol per liter of water. This concentration may be varied from about 0.003 to about 0.006 mol per liter. On the basis of 400 weight parts of water one obtains particles of the desired size in the absence of any latex formation only when from about 0.35 to about 0.75 weight part of the above surface-active or emulsifying agents are employed. Preferably the amount employed may be varied from about 0.4 to 0.7 with about 0.5 weight part an optimum amount in about 400 parts of water. When less than the minimum amount set forth above is employed reaction rates are decreased below a useful level. When greater than about 0.75 part are employed some undesired latex is obtained.

The other essential constituent of the suspending complex which is critical to the successful practice of this invention is polyvinyl alcohol. Polyvinyl alcohol must be present or a latex will be formed. The amount employed is preferably greater than 0.2 weight parts although better reaction rates and more uniform particles of polymer are obtained when about 0.3 to 0.6 weight parts are employed. Amounts as high as one part may be employed but there is little advantage obtained at these higher concentrations. The polyvinyl alcohol employed is preferably medium to high molecular weight hydrolyzed polyvinyl acetate. The degree of hydrolysis is greater than 50% and preferably between about 80 and 100%. Quite useful is a material which is about 88% hydrolyzed polyvinyl acetate and a high viscosity material. The viscosity is determined on a 4% water solution at 20° C. by the Hoeppler falling ball method and is greater than 20 and preferably greater than about 50 up to 105 and higher, to 150.

It is understood, of course, and well known to those skilled in the art that, although not an essential part of this invention, that agitation has some effect upon the particle size obtained in suspension polymerization systems. The type and degree of agitation ordinarily may be determined quite readily and it is one of the advantages of the suspension system of this invention that normal vigorous agitation employed for suspension systems is quite adequate. It is known that too much agitation decreases the particle size below that which may be desired and that too little agitation results in large agglomerates which also are undesirable. For example, in the 175 gallon reactor using a 5° Brumagin impeller at 0.5 weight parts of polyvinyl alcohol, 350 R. P. M. results in particle sizes of resin slightly smaller than desired, 300 R. P. M. results in particle sizes in the desired ranges and 250 R. P. M. results in particles which are larger than desired. At 350 R. P. M. a slight decrease in the polyvinyl alcohol content of a charge will result in larger particles and at 250 R. P. M. a slight increase in polyvinyl alcohol will result in smaller particles. Ordinarily the degree of agitation and amount of polyvinyl alcohol are readily balanced. It is desirable, therefore, in the practice of the invention to use agitation equivalent to that obtained in a 175 gallon reactor equipped with one baffle and a Brumagin type impeller having a blade angle of about 5°, blade area of about 16 square inches, a diameter of 10.2 inches which is operated at about 300 R. P. M., in conjunction with about 0.5 part of polyvinyl alcohol. Agitation equivalent to this in larger equipment can be determined quite readily both by calculation and small easily made adjustments in standard polymerization reactors. For example, in a 1100 gallon reactor equipped with two 16 inch Brumagin 9° blades operated at 365 R. P. M., only 0.3 part of polyvinyl alcohol is required for the desired particle size of polymer.

The improved process of this invention is applied to monomer mixtures containing a major proportion of an alkenyl aromatic compound and a minor proportion of a polyolefin, preferably conjugated diolefins. The alkenyl aromatic compound is defined as a polymerizable alkenyl substituted aromatic compound which possesses a single olefinic double bond linking a carbon atom attached to the aromatic ring to a methylene ($CH_2$) group. These materials may also be described as compounds of the formula $$Ar-\underset{\underset{R}{|}}{C}=CH_2$$

wherein Ar is an aromatic radical having its connecting valence on a ring carbon atom and R is hydrogen or alkyl. More preferably those materials most useful in the practice of this invention are those of the above formula wherein R is hydrogen or methyl and Ar is a mononuclear aromatic radical, such as styrene and polymerizable styrene derivatives represented by alpha-methyl styrene, vinyl toluene, ethyl styrene, monochlorostyrene, dichlorostyrene, alkoxy styrenes such as paramethoxy styrene and the like.

The conjugated aliphatic diolefin is preferably one containing from 4 to 6 carbon atoms including most preferably butadiene-1,3 and isoprene, and also dimethyl butadiene, 2-chlorobutadiene-1,3 and the like.

Although it is contemplated that the monomer mixtures polymerized by the suspension process of this invention will comprise a major proportion of the alkenyl aromatic compound and a minor proportion of the conjugated diolefin, which products are resinous in nature, it may also be desirable to include lesser amounts of other polymerizable monomers. If such other polymerizable monomers are included in the monomer mixture it is preferred that the concentration be kept low, less than about 10% of the total amount of the mixture and preferably such monomers should be poorly soluble in water since use of larger quantities of substantially water-soluble monomers will change the characteristics of the subject polymerization process and ordinarily will result in the formation of some latex. Preferably, monomer mixtures containing about 80 to 90 weight parts of styrene, vinyl toluene or alpha-methyl styrene and 10 to 20 weight parts of butadiene-1,3 are employed.

The polymerization initiator or catalyst must be a redox type, that is, a combination of an oxidizing material and a reducing material. For the purpose of this invention an oil-soluble organic peroxide or hydroperoxide is required. Included in this class of materials are benzoyl peroxide, chlorobenzoyl peroxide, cumene hydroperoxide, diisopropylbenzene hydroperoxide, phenolcyclohexane hydroperoxide and the like. The reducing materials required are water-soluble agents including those alkali metal salts of sulfur dioxide such as alkali bisulfites and polyalkylene polyamines of the formula $Na_2(CH_2CH_2NH)_nCH_2CH_2NH_2$ wherein $n$ is an integer, preferably from 2 to 10 such as triethylene tetramine, tetraethylene pentamine, and the like. When benzoyl peroxide is employed, the amount may be varied from about 0.2 to 1 part. However, about 0.5 part is a satisfactory concentration. When this peroxide is employed, the reducing agent used in conjunction therewith is preferably sodium bisulfite, although polyalkylene polyamines may also be used. Amounts of sodium bisulfite as low as 0.05 part are sufficient and amounts as high as 0.5 part may be used although little increase in reaction rate is noted. Tetraethylene pentamine, triethylene tetramine and the like in amounts from 0.001 to 0.1 part are also satisfactory. It should be noted that the redox complex used to initiate the polymerization reaction in the process of this invention is not critical but may be varied quite widely to include those systems well known to those skilled in the polymerization art so long as the oxidizing material is oil soluble and the reducing material is water-soluble. Preferred, of course, are organic peroxides and hydroperoxides and alkali metal sulfites and bisulfites and water-soluble polyalkylene polyamines.

The amount of water used in the process of this invention may be varied but particular considerations of heat transfer and materials handling on a production scale dictate a concentration of between about 300 to 500 weight parts, preferably about 400 weight parts water with 100 weight parts of monomers. When less than about 400 weight parts of water are employed in the polymerization system of this invention, i. e. 300, thick slurries which are difficult to handle are obtained. When more than about 500 parts of water are employed the process becomes uneconomical because of the low yield of polymer product per reactor charge.

The polymerization temperature will be dependent to some extent upon the type of redox initiator complex which is selected. In the case of benzoyl peroxide, used in conjunction with sodium bisulfite, a polymerization temperature of about 60–65° C. is preferred. A slower reaction is observed with these materials at a temperature of 50° C. More active initiators may be employed at temperatures of 30° C. and even 5° C. as is well known to those skilled in the art.

As has been described hereinabove, the amount, ratio and type of emulsifier and suspending agent, and type of initiator are critical and must be carefully controlled and balanced in order that one obtains pearl type polymers of the desired particle size without the formation of troublesome latices or other emulsions. The amount of alkyl sulfate or alkylaryl sulfonate employed determines both the reaction rate and the particle size, as well as controlling the formation of the latex. The use of polyvinyl alcohol also inhibits the formation of a latex and contributes to the formation of particles. An oil soluble catalyst is essential for the formation of polymer in the form of pearls and a water-soluble reducing agent is required in conjunction therewith.

A typical polymerization recipe employing the principles of this invention is given below:

| Materials: | Parts-weight |
|---|---|
| Styrene | 85.0 |
| Butadiene-1,3 | 15.0 |
| Water | 400.0 |
| Polyvinyl alcohol | 0.5 |
| Sodium decylbenzene sulfonate | 0.5 |
| Benzoyl peroxide | 0.5 |
| Sodium bisulfite | 0.2 |
| Tertiary $C_{12}$ mercaptan | 0.1 |

The water is charged to the reactor, the polyvinyl alcohol, sodium decylbenzene sulfonate and sodium bisulfite dissolved therein. The styrene containing the mercaptan mixed therein is then charged to the reactor. The peroxide catalyst dissolved in a small amount of styrene is added to the reactor which is then evacuated and the butadiene-1,3 added to the polymerization mixture. The mixture is then heated, while stirring, to about 60° C. Complete conversion of the monomers to polymer is obtained in less than about 12 hours with the production of finely divided uniform particle size copolymer product having an average particle size of about 150 to 200 microns in a water slurry which is free of latex and large agglomerates and which may be readily separated from the water by filtration or centrifuging. Polymerizations employing the above general recipe with other peroxides such as chlorobenzyl peroxide in place of benzyl peroxide, sodium lauryl sulfate in place of the sodium decylbenzene sulfonate and 0.01 part of tetraethylene pentamine employed in place of sodium bisulfite, result in similar polymerizations and products. Further, this recipe may be employed in reaction equipment varying from rotating bottles to large stirred reactors as high as 1100 gallon capacity, with only minor adjustments in the recipe which generally involve small increases or decreases in the amount of polyvinyl alcohol in relation to the degree and type of agitation which is ordinarily about 300 to 350 R. P. M. of standard impellers. When the above recipe is repeated in the absence of polyvinyl alcohol an unstable latex is obtained. When the recipe is repeated in the absence of sodium decyl benzene sulfonate or sodium lauryl sulfate or the like, the reaction is so slow as to be impractical on a production basis. When water-soluble catalysts are in the defined system no polymerization is obtained. When an amount of sodium decylbenzene sulfonate as high as one part is used a latex is obtained, and very slow reactions result in the absence of the water-soluble reducing agent.

Use of a small amount of a modifier such as the long chain mercaptans containing 8 to 18 carbon atoms, preferably dodecyl mercaptan and tertiary dodecyl mercaptan are included in the recipe in order to control the physical properties of the copolymer of styrene and butadiene-1,3, in an amount from about 0.01 to 1.0 part. Such mercaptan modifiers have greatly increased efficiency when employed in the specific suspension process of this invention as compared to the known and standard suspension polymerization systems in which the efficiency of such modifiers is quite poor.

The process of this invention is equally applicable to batch or continuous polymerization systems and may also be applied to monomer mixtures containing from 75 to 95 weight parts of other polymerizable styrene derivatives such as chlorostyrene, alpha-methyl styrene, para-methoxy styrene and the like, and from 5 to 25 weight parts of a conjugated diolefin such as isoprene and the like.

Another recipe which is successfully executed by means of the process of this invention is:

Materials:                                          Parts
    Vinyl toluene _____ 85.0
    Butadiene-1,3 _____ 15.0
    Water _____ 400.0
    Polyvinyl alcohol _____ 0.5
    Sodium dodecylbenzene sulfonate _____ 0.5
    Benzoyl peroxide _____ 0.5
    Sodium bisulfite _____ 0.4
    Dodecyl mercaptan _____ 0.15

When this polymerization recipe is charged to a stirred polymerizer at 60° C. complete conversion of monomer to polymer in less than about 12 hours are obtained with the production of uniform finely divided pearls of the copolymer of vinyl toluene and butadiene in a water slurry which is free of latex.

The average particle size of the polymers produced by the described suspension process is about 150 to 200 microns, although they may vary in size from about 75 to about 400 microns in size. Screen data on a dry resin from a 1100 gallon reactor charge using 0.3 part of polyvinyl alcohol and stirred at 365 R. P. M. with a double blade Brumagin impeller is as follows: 91% passed a 42 mesh screen, 32% passed a 100 mesh screen and 3% passed a 200 mesh screen. Powder of 10 to 50 microns is too fine and dusty to be desirable.

The polymer product produced by the process of this invention is essentially dustless, free-flowing and quite readily compounded into rubber and plastics for use in floor tiles, shoe soles and the like, and the physical properties of said copolymer products are equivalent to or better than similar products produced by the more conventional emulsion systems.

We claim:

1. A method for polymerizing a monomer mixture comprising a major proportion of an alkenyl aromatic compound and a minor proportion of a polyolefin to produce discrete particles of an interpolymer thereof which comprises suspending 100 weight parts of said monomer mixture in about 300 to about 500 weight parts of water with from about 0.01 to 1.0 weight part of an 8 to 18 carbon atom mercaptan modifier, from about 0.003 to about 0.006 mol per liter of water of a surface-active agent selected from the class consisting of alkali metal alkyl sulfates and alkylaryl sulfonates, wherein said alkyl groups contain from 8 to 14 carbon atoms, from about 0.2 to 1 weight part of polyvinyl alcohol and a redox initiator comprising an oil-soluble organic oxidant selected from the class consisting of aryl peroxides and hydroperoxides and a water-soluble reductant selected from the class consisting of alkali metal salts of sulfur dioxide and polyalkylene polyamines.

2. A method for polymerizing a monomer mixture containing from about 75 to about 95 weight parts of a polymerizable alkenyl aromatic compound of the formula

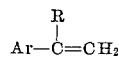

wherein Ar is a mononuclear aromatic radical having its connecting valence on a ring carbon atom and R is selected from the class consisting of hydrogen and alkyl, and from about 5 to about 25 weight parts of a conjugated diolefin containing 4 to 6 carbon atoms to produce discrete particles of an interpolymer thereof, which comprises suspending 100 weight parts of said monomer mixture in about 400 weight parts of water with from about 0.01 to 1.0 weight part of an 8 to 18 carbon atom mercaptan modifier, from about 0.35 to about 0.75 weight parts of sodium alkyl sulfate wherein said alkyl contains from 8 to 14 carbon atoms, from about 0.2 to 1 weight part of polyvinyl alcohol and a small amount of a redox initiator selected from the class consisting of oil-soluble aromatic peroxides and hydroperoxides in amount from about 0.2 to about 1 weight part and a reductant selected from the class consisting of alkali metal salts of sulfur dioxide in amount from about 0.05 to about 0.5 weight part and polyalkylene polyamines in amount from about 0.001 to about 0.1 weight part.

3. A method for polymerizing a monomer mixture containing from about 75 to about 95 weight parts of a polymerizable alkenyl aromatic compound of the formula

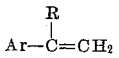

wherein Ar is a mononuclear aromatic radical having its connecting valence on a ring carbon atom and R is selected from the class consisting of hydrogen and alkyl, and from about 5 to about 25 weight parts of a conjugated diolefin containing 4 to 6 carbon atoms to produce discrete particles of an interpolymer thereof, which comprises suspending 100 weight parts of said monomer mixture in about 400 weight parts of water with from about 0.01 to 1.0 weight part of an 8 to 18 carbon atom mercaptan modifier, from about 0.35 to about 0.75 weight parts of a sodium alkylaryl sulfonate wherein said alkyl contains from 8 to 14 carbon atoms, from about 0.2 to 1 weight part of polyvinyl alcohol and a small amount of a redox initiator selected from the class consisting of oil-soluble aromatic peroxides and hydroperoxides in amount from about 0.2 to about 1 weight part and a reductant selected from the class consisting of alkali metal bisulfites in amount from about 0.05 to about 0.5 weight part and polyalkylene polyamines in amount from about 0.001 to 0.1 weight part.

4. A method for polymerizing a monomer mixture comprising about 80 to 90 weight parts of a monomer selected from the group consisting of a methyl styrene and styrene and about 10 to 20 weight parts of butadiene-1,3 to form discrete particles of a copolymer thereof which comprises suspending 100 weight parts of said monomer mixture in about 400 weight parts of water with about 0.01 to 0.1 weight part of an 8 to 18 carbon atom mercaptan modifier, about 0.4 to 0.7 weight part of a sodium alkyl sulfate wherein said alkyl contains from 8 to 14 carbon atoms, from about 0.3 to 0.6 weight parts of polyvinyl alcohol, from about 0.2 to 1.0 weight parts of an oil-soluble aromatic peroxide and sodium bisulfite in amount from about 0.05 to about 0.5 weight part.

5. A method for polymerizing a monomer mixture comprising about 80 to 90 weight parts of a monomer selected from the group consisting of a methyl styrene and styrene and about 10 to 20 weight parts of butadiene-1,3 to form discrete particles of a copolymer thereof which comprises suspending 100 weight parts of said monomer mixture in about 400 weight parts of water with about 0.01 to 0.1 weight part of an 8 to 18 carbon atom mercaptan modifier, about 0.4 to 0.7 weight part of a sodium alkylaryl sulfonate wherein said alkyl contains from 8 to 14 carbon atoms, from about 0.3 to 0.6 weight parts of polyvinyl alcohol, from about 0.2 to 1.0 weight parts of an oil-soluble aromatic peroxide and sodium bisulfite in amount from about 0.05 to about 0.5 weight part.

6. The method of claim 4 wherein the sodium alkyl sulfate is sodium decyl sulfate.

7. The method of claim 5 wherein the sodium alkylaryl sulfonate is sodium dodecylbenzene sulfonate.

8. The method of claim 5 wherein the sodium alkylaryl sulfonate is sodium decylbenzene sulfonate.

9. A method for polymerizing a monomer mixture comprising about 80 to 90 weight parts of a monomer selected from the group consisting of a methyl styrene and styrene and about 10 to 20 weight parts of butadiene-1,3 to produce discrete particles about 75 to 400 microns in diameter of a copolymer thereof which comprises suspending 100 weight parts of said monomer mixture in about 400 weight parts of water with about 0.4 to 0.7 weight part of a sodium alkyl benzene sulfonate wherein said alkyl contains from 10 to 12 carbon atoms, from about 0.3 to 0.6 weight parts of polyvinyl alcohol, from about 0.2 to 1.0 weight parts of an oil-soluble aromatic peroxide and a lesser amount of sodium bisulfite from about 0.05 to 0.5 weight part.

10. A method for polymerizing a monomer mixture comprising about 85 weight parts of styrene and about 15 weight parts of butadiene-1,3 to produce discrete particles of about 150 to 200 microns in diameter of a copolymer thereof, which comprises suspending 100 weight parts of said monomer mixture in about 400 weight parts of water containing about 0.3 to 0.5 weight part of a sodium alkyl benzene sulfonate wherein said alkyl contains 10 to 12 carbon atoms, about 0.5 weight part of polyvinyl alcohol, about 0.5 weight part of benzoyl peroxide and about 0.2 weight part of sodium bisulfite.

References Cited in the file of this patent

UNITED STATES PATENTS 2,673,194    Grim _____ Mar. 23, 1954

FOREIGN PATENTS 135,985    Australia _____ Feb. 26, 1947

OTHER REFERENCES

Industrial Engineer Chemistry (Winslow et al.), 43, 1108 (1951).